United States Patent
Nannapaneni et al.

(10) Patent No.: US 12,038,985 B2
(45) Date of Patent: Jul. 16, 2024

(54) BATCH USER INTERFACE CALLS AND RESPONSE PROCESSING

(71) Applicant: SAP SE, Walldorf (DE)

(72) Inventors: Kalyan Chakravarthy Nannapaneni, Bangalore (IN); Ajay Krishna Uniyal, Bangalore (IN); Srinivas S, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/059,801

(22) Filed: Nov. 29, 2022

(65) Prior Publication Data

US 2024/0176826 A1 May 30, 2024

(51) Int. Cl.
 *G06F 16/00* (2019.01)
 *G06F 3/023* (2006.01)
 *G06F 9/30* (2018.01)
 *G06F 16/951* (2019.01)

(52) U.S. Cl.
 CPC .......... *G06F 16/951* (2019.01); *G06F 3/0236* (2013.01); *G06F 9/30003* (2013.01)

(58) Field of Classification Search
 None
 See application file for complete search history.

(56) References Cited

U.S. PATENT DOCUMENTS

| | | | |
|---|---|---|---|
| 7,765,549 B1 * | 7/2010 | Lauer | G06F 9/5005 709/201 |
| 8,850,362 B1 * | 9/2014 | Khoshnevisan | G06F 16/951 715/853 |
| 9,185,182 B2 * | 11/2015 | Pearce | G06F 16/322 |
| 9,208,448 B2 * | 12/2015 | Fisher | G06N 20/00 |
| 2001/0025304 A1 * | 9/2001 | Keith, Jr. | G06F 16/2246 709/217 |
| 2004/0236724 A1 * | 11/2004 | Chien | G06F 16/9538 |
| 2005/0209994 A1 * | 9/2005 | Noro | G06F 16/9538 |
| 2008/0066019 A1 * | 3/2008 | Worek | G05B 19/4183 715/965 |
| 2009/0327274 A1 * | 12/2009 | Kejariwal | G06F 16/951 707/999.005 |
| 2010/0083095 A1 * | 4/2010 | Nikovski | G06F 16/951 715/234 |
| 2010/0100563 A1 * | 4/2010 | Corella | G06F 16/951 707/E17.014 |

(Continued)

Primary Examiner — Jean M Corrielus
(74) Attorney, Agent, or Firm — Fountainhead Law Group P.C.

(57) ABSTRACT

User interface responsiveness is improved using batch interface calls and response processing. To do this, a selection, via a user interface, is obtained of nodes of a hierarchy corresponding to a hierarchical data structure containing information to be presented in the user interface based on the selection. A separate request is sent to a database to obtain information corresponding to each of the nodes. Responses corresponding to a particular request are received from the database. Each response is processed to obtain parsed data in separate threads such that the responses are executable in parallel. The processing of the responses outputs parsed data for the corresponding response. The parsed data is obtained and the parsed data for a particular response is incrementally presented in the user interface as it is obtained.

17 Claims, 7 Drawing Sheets

(56) References Cited

U.S. PATENT DOCUMENTS

| | | | |
|---|---|---|---|
| 2011/0161946 A1* | 6/2011 | Thomson | G06Q 10/10 |
| | | | 717/155 |
| 2012/0060126 A1* | 3/2012 | Jackson, Jr. | G06F 16/951 |
| | | | 715/854 |
| 2012/0158447 A1* | 6/2012 | Jain | G06Q 10/06311 |
| | | | 705/7.15 |
| 2014/0033076 A1* | 1/2014 | Al-Alami | G06F 3/0481 |
| | | | 715/753 |
| 2014/0195601 A1* | 7/2014 | Dillon | G06F 16/951 |
| | | | 709/203 |
| 2014/0330835 A1* | 11/2014 | Boyer | G06F 16/2379 |
| | | | 707/741 |
| 2015/0363494 A1* | 12/2015 | Norman | G06F 16/951 |
| | | | 707/769 |
| 2016/0162456 A1* | 6/2016 | Munro | G06F 16/24532 |
| | | | 704/9 |
| 2020/0042339 A1* | 2/2020 | Shankar | G06F 8/61 |

* cited by examiner

```
AuditFile
    xmlns = urn:OECD:StandardAuditFile-Tax:PT_1.04_01                    500
    xmlns:xsi = http://www.w3.org/2001/XMLSchema-instance
    xsi:schemaLocation = urn:OECD:StandardAuditFile-Tax:PT_
    Header
        AuditFileVersion 1.04_01
        CompanyID 123244546554
        TaxRegistrationNumber 501234780
        TaxAccountingBasis I
        CompanyName Country Template Portugal Name 2 - to te
        BusinessName SAP LABS INDIA
        CompanyAddress
        FiscalYear 2013
        StartDate 2013-01-01
        EndDate 2013-12-31
        CurrencyCode EUR
        DateCreated 2020-07-02
        TaxEntity TEST
        ProductCompanyTaxID 504569759
        SoftwareCertificateNumber 631
        ProductID SAP ERP/SAP SE
        ProductVersion SAP ECC 6.0
        HeaderComment TEST
        Telephone +351 211234567
        Email countrytemplateportugal@blabla.com
        Website www.blabla.com
    MasterFiles
        GeneralLedgerAccounts
        Customer
        Customer
        Customer
        Supplier
        Supplier
        Supplier
        Product
        Product
        Product
        Product
        Product
        Product
        TaxTable
    GeneralLedgerEntries
    SourceDocuments
        SalesInvoices
        MovementOfGoods
        Payments
```

FIG. 5

```xml
<Email>countrytemplateportugal@blabla.com</Email>
<Website>www.blabla.com</Website>
</Header>
<MasterFiles>
<GeneralLedgerAccounts>
<TaxonomyReference></TaxonomyReference>
<Account>
<AccountID>0000128000</AccountID>
<AccountDescription>Account with letters</AccountDescription>
<OpeningDebitBalance>0.0</OpeningDebitBalance>
<OpeningCreditBalance>0.0</OpeningCreditBalance>
<ClosingDebitBalance>0.0</ClosingDebitBalance>
<ClosingCreditBalance>0.0</ClosingCreditBalance>
<GroupingCategory>AM</GroupingCategory>
<GroupingCode>10</GroupingCode>
</Account>
<Account>
<AccountID>100000</AccountID>
<AccountDescription>Test GL Account 1</AccountDescription>
<OpeningDebitBalance>148.98</OpeningDebitBalance>
<OpeningCreditBalance>0.0</OpeningCreditBalance>
<ClosingDebitBalance>1455772865.95</ClosingDebitBalance>
<ClosingCreditBalance>95118.02</ClosingCreditBalance>
<GroupingCategory>AM</GroupingCategory>
<GroupingCode>10</GroupingCode>
</Account>
<Account>
<AccountID>100001</AccountID>
<AccountDescription>Test GL Account 2</AccountDescription>
<OpeningDebitBalance>0.0</OpeningDebitBalance>
<OpeningCreditBalance>0.0</OpeningCreditBalance>
<ClosingDebitBalance>0.0</ClosingDebitBalance>
<ClosingCreditBalance>1000.0</ClosingCreditBalance>
<GroupingCategory>AM</GroupingCategory>
<GroupingCode>10</GroupingCode>
</Account>
<Account>
<AccountID>100002</AccountID>
<AccountDescription>Test GL Account 3</AccountDescription>
<OpeningDebitBalance>0.0</OpeningDebitBalance>
<OpeningCreditBalance>0.0</OpeningCreditBalance>
<ClosingDebitBalance>0.0</ClosingDebitBalance>
<ClosingCreditBalance>1000.0</ClosingCreditBalance>
<GroupingCategory>AM</GroupingCategory>
<GroupingCode>10</GroupingCode>
</Account>
```

FIG. 6

BATCH USER INTERFACE CALLS AND RESPONSE PROCESSING

BACKGROUND

The present disclosure pertains to web applications and in particular to user interface calls.

Web applications are software applications that run within a web-browser. The web browser may provide a user interface for presenting and may access information obtained from a backend system. Such applications and information may be provided by a cloud platform or by an on-premise system.

In some situations a user would like to view content of various generated technical formats. Generally, these technical formats are formatted as a hierarchy having various sections and subsections. Such technical formats could contain a large set of data and may be complex in structure. In some web applications, when a user has an option to select sections/subsections to view the corresponding data, the processing for accessing and presenting the information is done using sequential calls and the user needs to wait until all these sections (i.e., nodes of the hierarchy) are loaded, potentially using a default threshold (e.g., 400 rows).

Making sequential calls and processing all of the sections of data before presenting the information may cause problems for the end user. For instance, there may be timeout errors while reading so many data calls; there may be timeout errors on the frontend web browser when processing and displaying the data; the user may be required to wait a longer amount of time than desired for entire screen to render; and performance may not be optimal and may not result in good user experience.

The present disclosure addresses these issue and others, as further described below.

BRIEF DESCRIPTION OF THE DRAWINGS

FIG. 5 shows an example hierarchical structure of a technical file having various sections and subsections, according to an embodiment.

FIG. 6 shows an example of data within a technical file formatted as a hierarchy having various sections and subsections, according to an embodiment.

DETAILED DESCRIPTION

Figure 1:
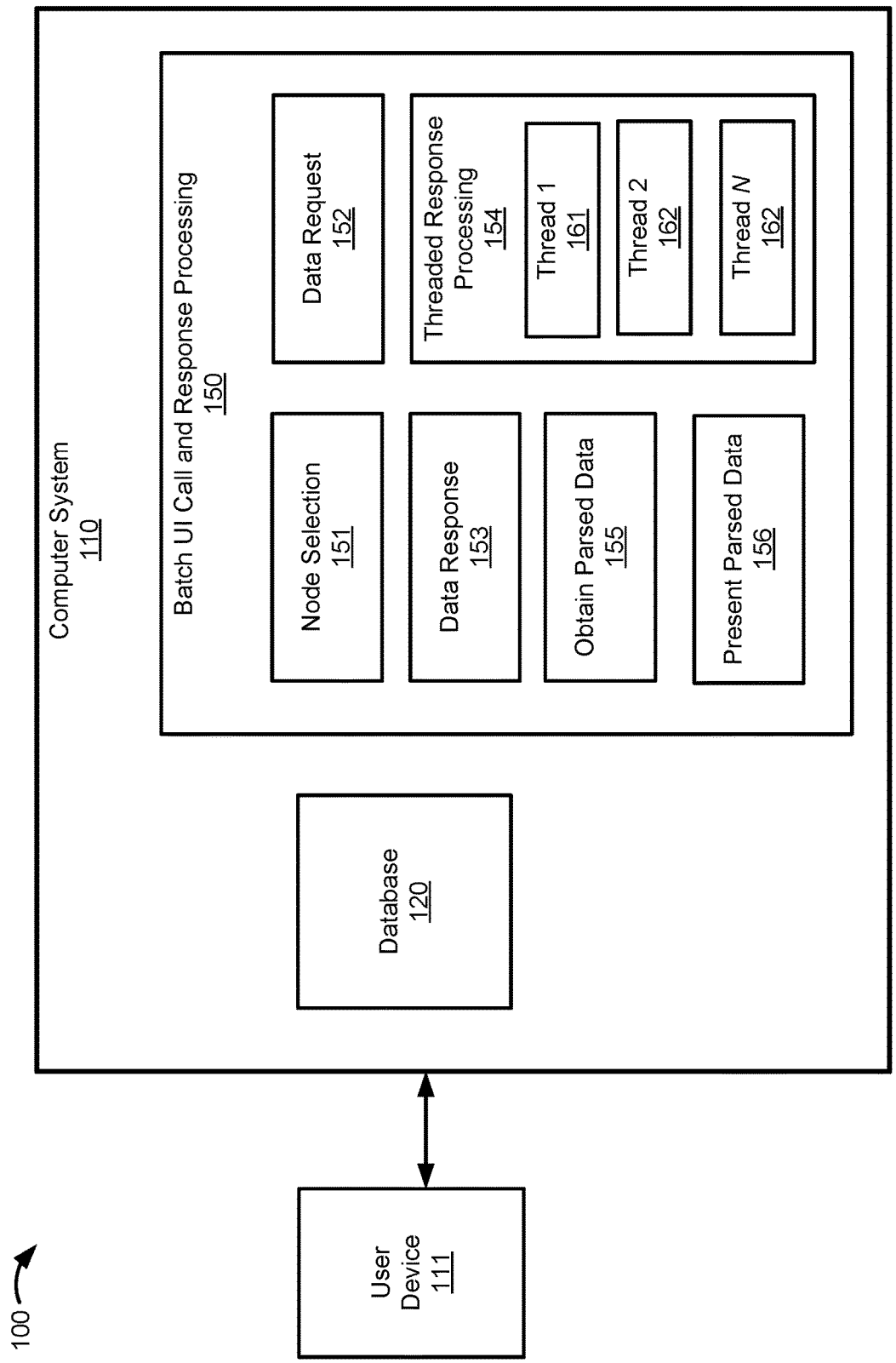
FIG. 1 shows a diagram of a computer system providing optimized batch user interface calls and response processing, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above web applications are software applications that run within a web-browser where the web browser may provide a user interface for presenting and may access information obtained from a backend system.

For example, a web application may provide a user interface capable of presenting large sets of information that can be submitted/reported to meet government compliance requirements. The information to be reported may be required to be in specific technical formats such as .xml, .xls, etc. Such technical formats may be difficult for users to review. Furthermore, the amount of information may be large in scale (e.g., 20-30 GB files are typical for such reports).

As used herein, the terms "technical format" and "technical file" respectively refer to file formats or files themselves that are designed to be used for storing data to be processed before being presented to an end user in a user interface. That is, the technical format is not designed to be directly inspected by a typical end user, even if the underlying data is designed to be more easily inspected and reviewed by a technical user or programmer (e.g., the file uses markdown). For instance, XML files are referred to as a "technical format" and XML files are referred to ask "technical files" because while they use markdown to be more easily inspected by and coded by computer programmers and software engineers, such files are designed to be parsed and processed before the information is presented to an end user via a user interface.

As mentioned above, users may want to view content of various generated technical formats, which may be formatted as a hierarchy having various sections and subsections. However, when such technical formats contain a large set of data the processing of that data may take a large amount of time corresponding to the large amount of data. For example, this may happen when the user interface presents a selection menu for a hierarchy (e.g., with nodes for the root of the hierarchy, each section of the hierarchy, and each subsection) and the user selects the root of the hierarchy to be viewed (i.e., the user selects to view all of the data within the technical file). In certain web applications, when a user selects, the processing for accessing and presenting the information is done using sequential calls and the user needs to wait until all these sections (i.e., all nodes of the hierarchy) are loaded.

An example of a hierarchy for a technical file is provided in FIG. 5 and an example of some of the data that may be within that hierarchical structure is provided in FIG. 6.

In situations where the user selects the root node of the hierarchy, for example, or another situation where the user makes a section for information that containing a large amount of data, making sequential calls and processing the data sequentially before presenting the information may cause problems for the end user, as mentioned above. For instance, there may be timeout errors while reading so many data calls; there may be timeout errors on the frontend web browser when processing and displaying the data; the user may be required to wait a longer amount of time than desired for entire screen to render; and performance may not be optimal and may not result in good user experience.

The present disclosure provides techniques for optimized batch user interface calls and response processing can processes large amounts of data in technical formats by batching the calls and processing based on the hierarchy such that it can be presented in the UI as forms or tables, as in other complex output formats. Features and advantages of these techniques include the ability to avoid timeout issues, such as UI timeout errors; provide an improved user experience (e.g., presenting data as it is processed batch by batch); enable the user to view the processed data batch-by-batch; reduced wait time by the user as a result of optimized parallel batch calls; and optimized handling of technical formats with multiple sections/subsections with a large amount of data.

As an example of such optimized processing, batch responses may be written in a common file and an instance of this file may be created every time the UI receives a response to a call. These batch calls are created when the user selects one or more nodes. The frontend (main thread) creates parallel batch calls for every selected node. Since processing time depends on the complexity of the batch call, the response may be received in any sequence (e.g., the response received need not be in the same sequence as the calls). Based on the received response a new web worker instance is created for common file and processed data is displayed on the screen.

The optimized batch processing techniques described herein avoid such timeouts by having the code for processing data responses based on the target control (e.g., Form/Table). This file instance is created every time a node in hierarchy is selected as web worker, which enables the browser to work parallelly for every response received. Once the data is processed it is passed to be rendered in the preview screen for that specific section and the information displayed on the screen. Thus, the user can start viewing the section data while the other section data is prepared in other web worker instances. An example using web workers is described below with respect to FIG. 4 and FIG. 5.

To refer back to the poor user experience and timeout problems that occurred in prior techniques mentioned above, consider an example report with 20 nodes in a hierarchy. If the data processing needed to display information for these 20 needed to be performed all at once (e.g., in the same thread) then the user might need to wait until all of the node data is processed in order to view the data and there is a chance of timeout errors and the screen becoming unusable for end user. The optimized batch processing techniques avoid such timeouts by batching the requests and processing the response data in separate threads (e.g., using web workers) and rendering the data separate.

Figure 7:
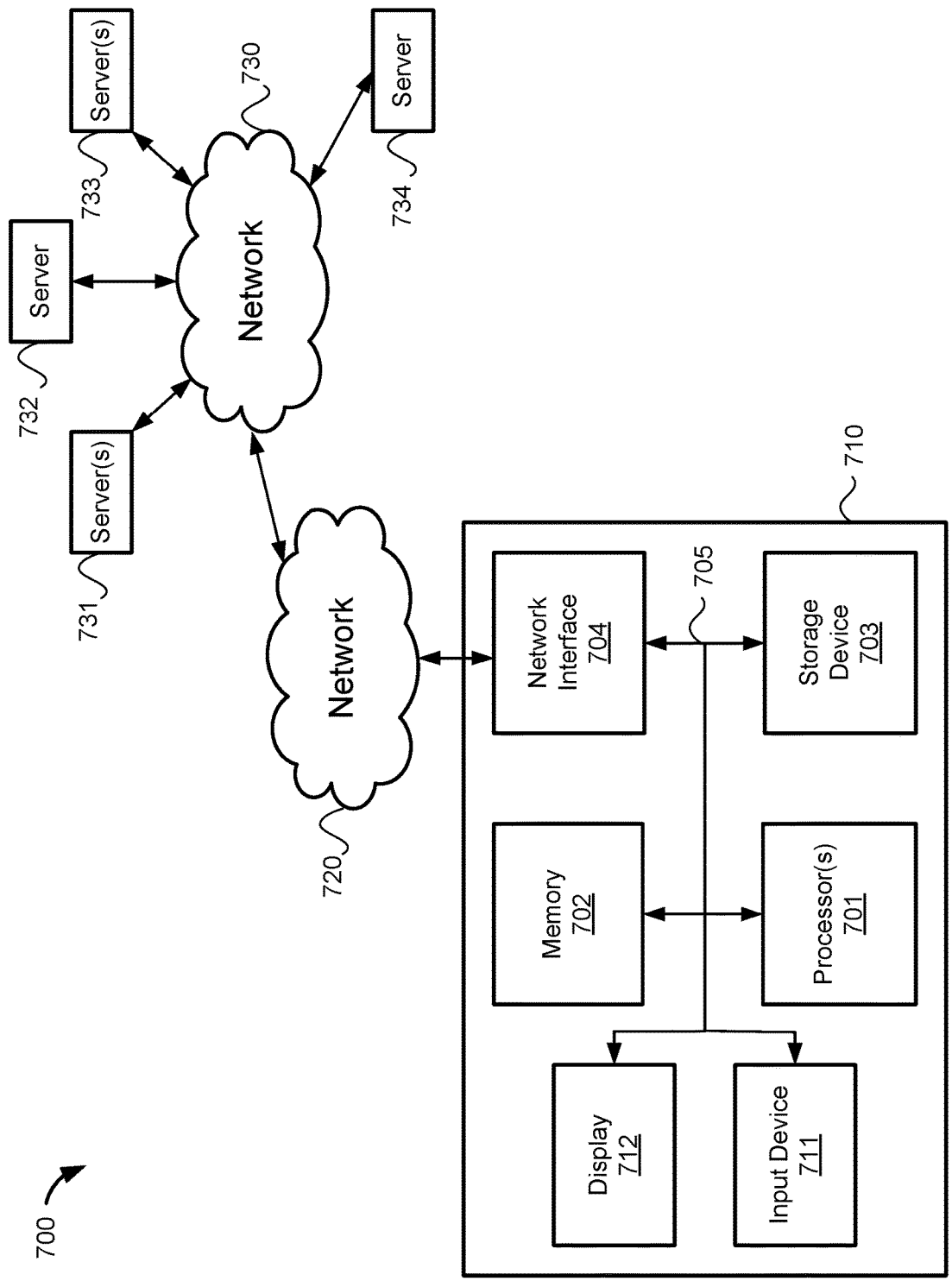
FIG. 7 shows a diagram of hardware of a special purpose computing machine for implementing systems and methods described herein.

Systems and methods for optimized batch user interface calls and response processing are described below with respect to FIG. 1 and FIG. 2. Specific examples of optimized batch user interface calls and response processing are described below with respect to FIG. 3 and FIG. 4. As mentioned above, FIGS. 5 and 6 show an example hierarchy of a technical file and some of the data contained therein. FIG. 7 shows an example system that can implement the optimized batch user interface calls and response processing techniques.

FIG. 1 shows a diagram 100 of a computer system 110 providing optimized batch user interface calls and response processing, according to an embodiment. In some embodiments the computer system 110 may be a cloud computing platform. In some embodiments the computer system 110 may be an on-premise computing system.

The computer system 110 includes a database 120 and software components 150 for performing batch user interface call and response processing. The database 120 may be an in-memory database, for example. The software components 150 may be included in a web application, for example. The software components 150 include a node selection component 151, a data request component 152, a data response component 153, a threaded response processing component 154, an obtain parsed data component 155, and a present parsed data component 156.

The software components 150 for performing batch user interface call and response processing may be configured to provide a user interface to a user device 111. The user device may access the user interface of the web application containing the software components 150 using a web browser, for example.

The node selection component 151 may be configured to obtain a selection, via a user interface, of one or more nodes of a hierarchy, the hierarchy corresponding to a hierarchical data structure of a data file containing information to be presented in the user interface based on the selection. An example of selecting nodes is described below with respect to FIGS. 3-6.

The data request component 152 may be configured to send one or more requests to a database to obtain information corresponding to each of the one or more nodes, the one or more requests including a separate request for each of the one or more nodes. In some embodiments, the requests may be HTTP requests. In some embodiments the requests may use the Open Data Protocol (OData).

The data response component 152 may be configured to obtain one or more responses from the database, each response corresponding to a particular request. The responses may be obtained based on queries made to the database 120. The queries may be made using a backend OData service, for example.

The threaded response processing component 154 may be configured to process each of the one or more responses to obtain parsed data for each of the one or more responses, the one or more responses being processed in separate threads such that the one or more responses are executable in parallel, the processing of each of the one or more responses outputting parsed data for the corresponding response. The threaded response processing component 154 includes "Thread 1" 161 for processing a first response, "Thread 2"

162 for processing a second response, and "Thread N" for processing an Nth response, where N is the number of responses. That is, the threaded response processing component 154 includes separate threads for processing each of the responses. The threaded execution may be performed using web workers, for example.

The obtain parsed data component 155 may be configured to obtain the parsed data output by the separate threads. The data may be parsed such that it can be rendered in the user interface as a "form" or as a "table," for example, as discussed below.

The present parsed data component 156 may be configured to incrementally present the parsed data for a particular response in the user interface as it is obtained. That is, the data may be presented as its processing is completed as the processing is performed in parallel. Thus, the user may see data once it becomes available without waiting for all of the data to be processed. Furthermore, the user interface does not freeze (i.e., become unresponsive) or issue a time out error.

In some embodiments, the method may also determine whether a cardinality of a particular response is equal to one or greater than one. In some embodiments the response may be parsed into a form format when the cardinality is one, and the response may be parsed into a table format when the cardinality is greater than one.

In some embodiments, one of the one or more requests includes information for each node to be parsed into a form format and the other requests of the one or more requests do not include information to be parsed into the form format.

In some embodiments, the processing of each of the one or more responses is performed without issuing a timeout error in the user interface and without the user interface freezing or becoming unresponsive.

In some embodiments, the processing of each of the one or more responses includes parsing the data using javascript.

In some embodiments, the one or more responses are processed in separate threads using separate web worker instances.

In some embodiments, the one or more requests are made using the Open Data protocol.

Figure 2:
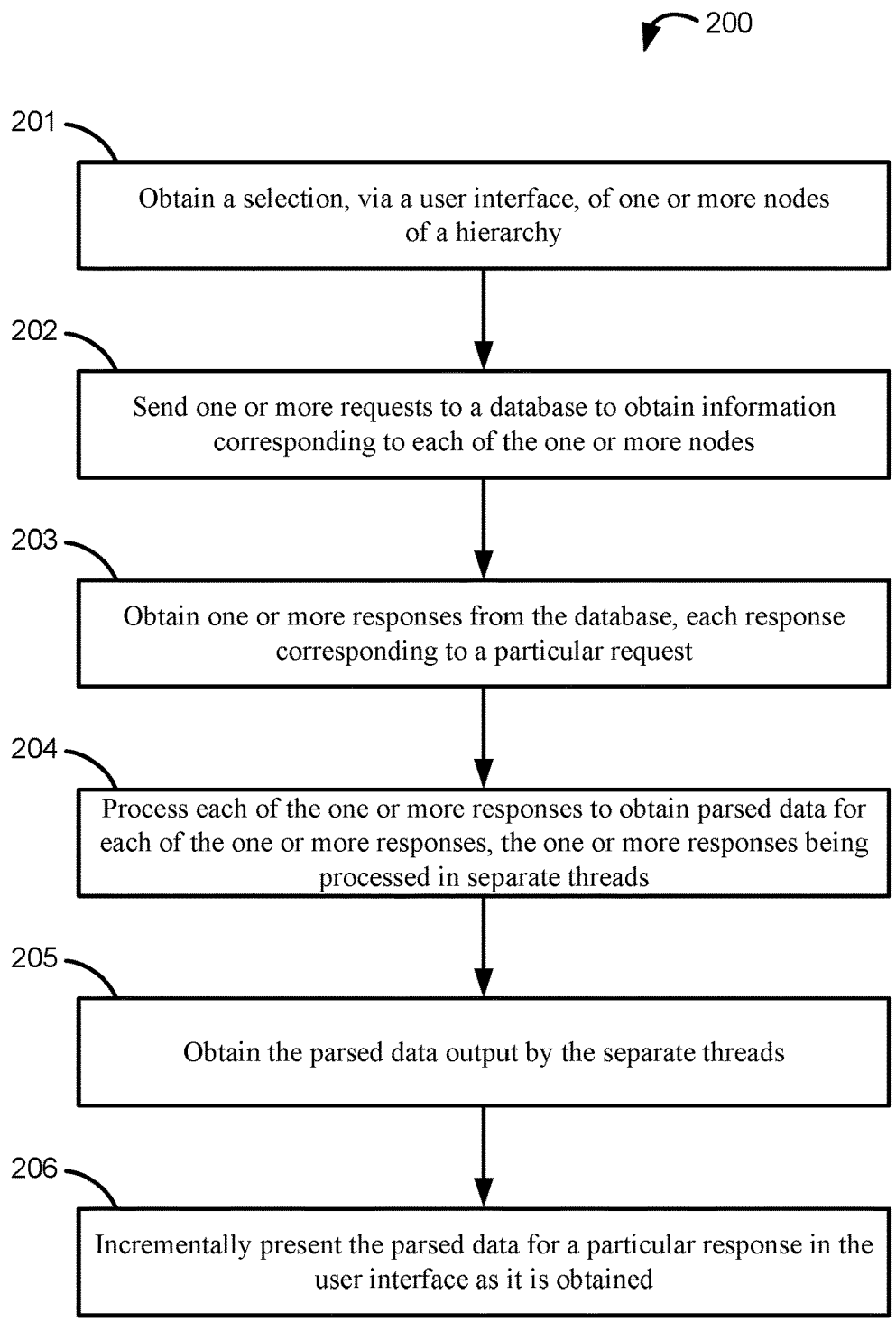
FIG. 2 shows a diagram of a method for making optimized batch user interface calls and processing responses, according to an embodiment.

FIG. 2 shows a diagram 200 of a method for making optimized batch user interface calls and processing responses, according to an embodiment. This method may be performed by the computer system 110 of FIG. 1. This method may also be performed by executing computer program code stored on a non-transitory computer readable medium.

At 201, the method may obtain a selection, via a user interface, of one or more nodes of a hierarchy, the hierarchy corresponding to a hierarchical data structure of a data file containing information to be presented in the user interface based on the selection;

At 202, the method may send one or more requests to a database to obtain information corresponding to each of the one or more nodes, the one or more requests including a separate request for each of the one or more nodes;

At 203, the method may obtain one or more responses from the database, each response corresponding to a particular request;

At 204, the method may process each of the one or more responses to obtain parsed data for each of the one or more responses, the one or more responses being processed in separate threads such that the one or more responses are executable in parallel, the processing of each of the one or more responses outputting parsed data for the corresponding response;

At 205, the method may obtain the parsed data output by the separate threads; and At 206, the method may incrementally present the parsed data for a particular response in the user interface as it is obtained.

In some embodiments, the method may also determine whether a cardinality of a particular response is equal to one or greater than one. In some embodiments the response may be parsed into a form format when the cardinality is one, and the response may be parsed into a table format when the cardinality is greater than one.

In some embodiments, one of the one or more requests includes information for each node to be parsed into a form format and the other requests of the one or more requests do not include information to be parsed into the form format.

In some embodiments, the processing of each of the one or more responses is performed without issuing a timeout error in the user interface and without the user interface freezing or becoming unresponsive.

In some embodiments, the processing of each of the one or more responses includes parsing the data using javascript.

In some embodiments, the one or more responses are processed in separate threads using separate web worker instances.

In some embodiments, the one or more requests are made using the Open Data protocol.

EXAMPLE

Specific examples of optimized batch user interface calls and response processing are described below with respect to FIG. 3 and FIG. 4.

Figure 3:
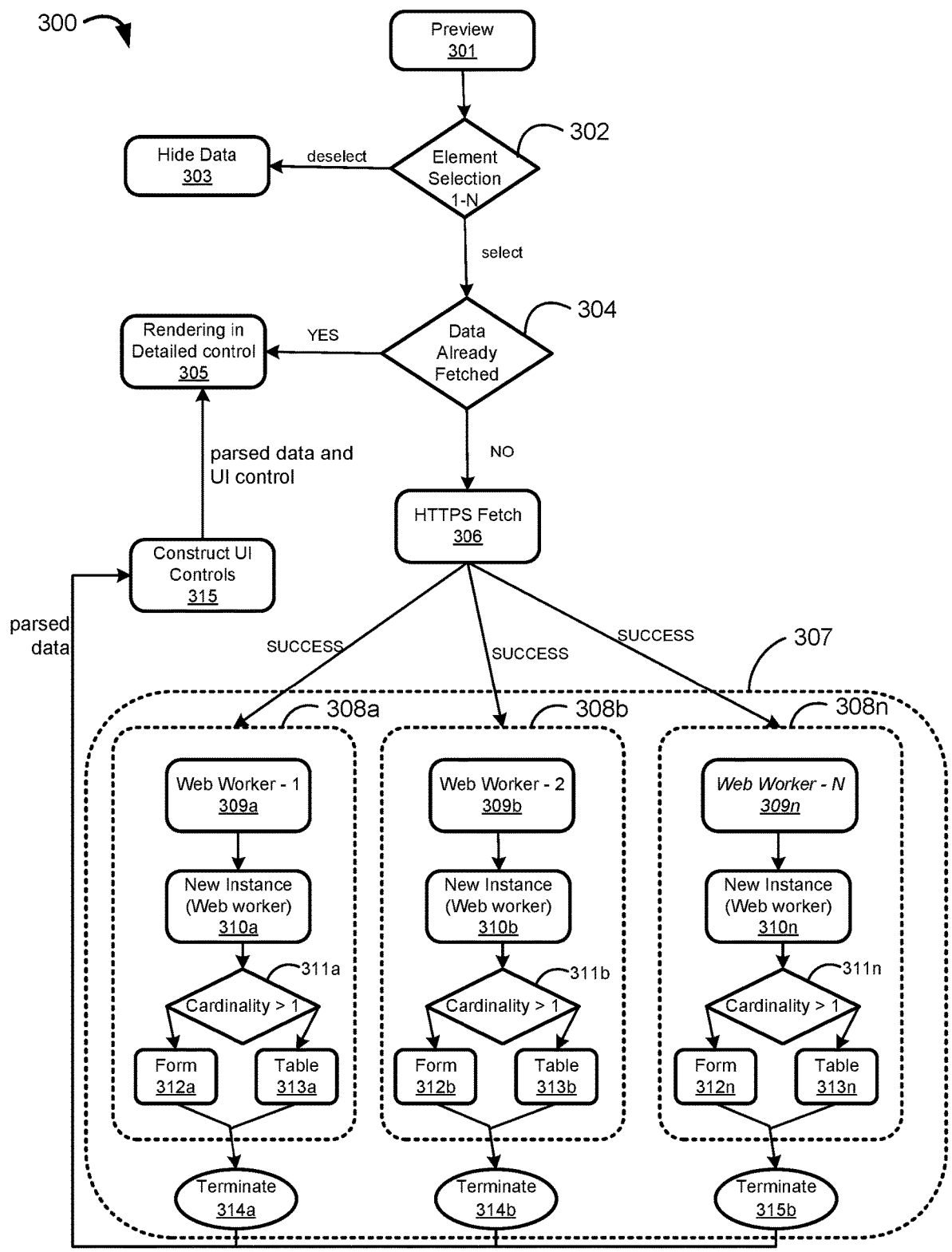
FIG. 3 shows a flowchart of user interface calls and response processing using web workers, according to an embodiment.

FIG. 3 shows a flowchart 300 of user interface calls and response processing using web workers, according to an embodiment. The processing of the user interface calls and the responses is performed by a web application. In this example, the web application is a document and reporting application that is capable of handling large files with large amounts of data (e.g., 20-30 GB files are typical but larger and smaller files may be handled as well). These files may be in a technical format such as .xml, .xls, or another worksheet or data format, as discussed above.

As an overview, the application may present hierarchical data to a user as forms or tables (in a user interface provided by their web browser) and enable the user to select one node or multiple nodes (e.g., using a hierarchical checklist) to view the data. Furthermore, the user may be able to view the data without running into timeout issues, which is achieved by using web worker capability. "Web workers" are means for running scripts in background threads such that tasks can be performed without interfering with the user interface, which runs in a separate thread.

In this example, the Open Data Protocol (OData) may be used to obtain information of the technical file (i.e., the document/report) from the database. OData is a protocol for interacting with data via RESTful interfaces and determines how resources are requested, among other things. A RESTful API is an interface that enables computer systems to exchange information securely over a network.

For every oData read call response for a selected node (of the hierarchy), the application may initiate a new instance of a web worker which is created to process the response as per the target display (e.g., either a form display format or a table display format). These web workers are terminated once the processing is completed. This enables the UI to process the response data parallelly as the web worker threads can execute in parallel. This provides advantages over traditionally response data where multiple calls are processed sequentially, which may lead to timeouts as discussed above.

Referring to FIG. 3, at 301 the application provides a "preview" user interview. In this example, the web application provides a user interface configured to present information in a technical file. The technical file is a document or report that can be submitted to a government entity or other organization (e.g., for compliance purposes). The data of the technical file may be stored in a remote database (e.g., a cloud database or an on-premise database) that is remote from the user's system that is running the web browser.

The web application can present a "preview" 301 of the information in the report. For example, the first leaf node within the hierarchy (e.g., the first child node without its own child node) may be selected for the preview and a request for the information corresponding of that node made be obtained from the database. Details of making the request and receiving a response are described in further detail below. The response can be parsed and formatted as a "form" or as a "table" and presented to the user in the user interview as a "preview" 301 of the document or report (represented by the technical file). Parsing of the response is described in further detail below. In some other embodiments, the user interface may not include a preview.

For example, referring to FIG. 5 and FIG. 6, the "Audit-File" of FIG. 5 contains a hierarchy including sections for "Header," "MasterFiles," "General Ledger Entries," and "Source Documents" which each of these sections including data or further subsections. For example, the MasterFiles section includes "GeneralLedgerAccounts" as its first subsection. While the "Header" is the first section of the audit file, it contains general information like the AuditFileVersion, CompanyID, and other names and dates, but not information that it being reported itself. In this case, the "preview" may select the first leaf node under the GeneralLedgerAccounts subsection of the MasterFiles section. As shown in FIG. 6, the GeneralLedgerAccounts subsection of the MasterFiles section includes a TaxonomyReference subsection, which is empty, followed by an Account subsection, which includes details regarding AccountID, Accountdescription, OpeningDebitBalance, and so on. In this example, the preview can show a table with rows and columns to present the Account information. For example, the first column can contain AccountIDs such as 000012B000, 10000, and 10001 with additional columns to present the values for the OpeningDebitBalance, OpeningCreditBalance, ClosingDebitBalance, ClosingCreditBalance for each of the AccountIDs, or other information within the Account subsection.

Presenting the Account information is just an example for this particular AuditFile. The information can be different in other situations using other files and also different means for selecting the initial node to be previewed can be used. Selecting the first leaf node is just an example.

At 302, the user can make an "element selection 1-N." That is, the user may select one or more elements (e.g., nodes/sections/subsections) of the hierarchy. To enable the user to do this, the application may provide a user interface with a hierarchical checklist having "+" (plus) and "−" (minus) icons to enable the user to expand to hide subsections within a section of the hierarchy.

As mentioned above, the Account node may be used for the preview to show an Account table. In such an example, the element (e.g., checkbox) for the Account node may already be selected within the user interface.

Should the user deselect the Account node at 302, the application may perform a Hide Data operation 303 in response to hide the Account table from the user interface. The data for the Account table may be retained such that if the user selects Account again, the application may determine that whether the data was already fetched at 304. If the data was already fetched (YES at 304), then the application may provide an operation for rendering of that information in detailed control 305. That is, the information may be rendered in detail within the user interface to be viewed by the user along with user interface controls for the user to provide inputs to control what is shown in the UI.

To continue this example, the user may select the user interface element (e.g., checkbox) for GeneralLedgerAccounts, which is the parent of Account within the hierarchy. Selecting GeneralLedgerAccounts may automatically select all of its children within the user interface. Its children include TaxonomyReference, Account, and other subsections not shown in FIG. 5 or FIG. 6. In this case, the Account information was already fetched and so it may be rendered in the UI at 305 while the other subsections (nodes) of GeneralLedgerAccounts may be fetched from the database using the HTTPS Fetch operation 306.

At 306 HTTPS Fetch may batch the user interface calls such that they are optimized. The HTTPS Fetch at 306 is shown in FIG. 4 as a call from the Preview Screen 420 to the Backend 430. In this example an OData call is made to the backend which queries the database.

As an example of batching, requests for information corresponding to the same table may be batched together. For example, the OpeningDebitBalance, OpeningCreditBalance, ClosingDebitBalance, ClosingCreditBalance, and other account information for AccountIDs 000012B000, 10000, 10001, and any other AccoutIDs may be batched together into a single request. When the response corresponding to that request is received, it may be sent to a web worker to be processed (e.g., parsed and formatted into a table to be rendered in the UI). The responses for each separate batch may be sent to a separate web worker.

In some cases the nodes selected by the user are not formatted as row and column tables but instead are "forms," which are a list of labeled data. For example, the information shown in the Header in FIG. 5 can be formatted as a table as it is a list of version numbers, ID numbers, names, addresses, dates, and other alphanumeric values without any general table (row and column) structure. Since the amount of information in a form may typically be smaller than the amount of information in a table, all of the selected nodes corresponding to forms may be grouped together into a single batch to reduce the number of calls made to the backend, thereby optimizing the calls while still avoiding timeout issues.

The processing and operations performed by the web application described so far with respect to 301, 302, 303, 304, 305, and 306 may be performed in a "main thread" while each of the web workers may process data in separate "external" threads 307. The separation between the "main thread" processing and the "external thread" processing is shown in FIG. 4 and described in further detail below with respect to that figure.

Referring to FIG. 5, the external threads 307 include a separate thread 308, 308b, 308n for each web worker 309a, 309b, 309n. There may be as many web workers as there are batches, where each batch is processed by a different web worker instance. FIG. 5 shows three instances: "Web Worker-1" 309a, "Web Worker-2" 309b, and "Web Worker-N" 309n, where N (and n) in italics indicates the number of batches. That is, a separate web worker instance for each batch as just mentioned. Details of the first external thread 308a with "Web Worker-1" 309a are given below and these same features and functionality apply to the other external threads 308 and their web workers 309.

At 309a Web Worker-1 can be scheduled an a new instance of a web worker can be created at 310a to process the response data successfully received by the HTTPS fetch 306 of the batch of information from the database.

At 311a the external thread 308a determines whether the cardinality of the information in the response data is greater than 1. That is, is the response data a form (cardinality of 1) or a table (cardinality greater than 1). If the cardinality is 1, the response data is parsed and formatted into a form 312a. If the cardinality of the response data is greater than 1, the response data is parsed and formatted into a table 313a. Then the external thread 308a is terminated at 314a.

The processing in the external threads 308b (including 309b through 314b) through 308n (including 309n through 314n) is performed similar to the processing in external thread 308a except they are performed is separate threads, which may execute in parallel, and they may operate on different input data and provide different output data.

The parsed data from each of the external threads 308 is returned to a UI control construction process 315 which constructs UI controls for the parsed data. For example, the UI controls for a form may be different than those for a table. For instance, a table may include controls for sorting the columns of the table. Then the parsed data and UI controls are provided to the rendering in detailed control operation 305 to be presented in the user interface.

To restate the process, the calls (requests) to the backend service (e.g., OData service) to obtain the data for a particular report/document may be batched based on the hierarchy of nodes such that information for that will be presented as a table is batched together. Furthermore, all forms that are selected may be batched together instead of having separate calls. Then a web worker instance is created to process the response for each batch such that the information is formatted into forms and tables in the background (in separate threads) without disrupting the user interface or causing timeouts.

Figure 4:
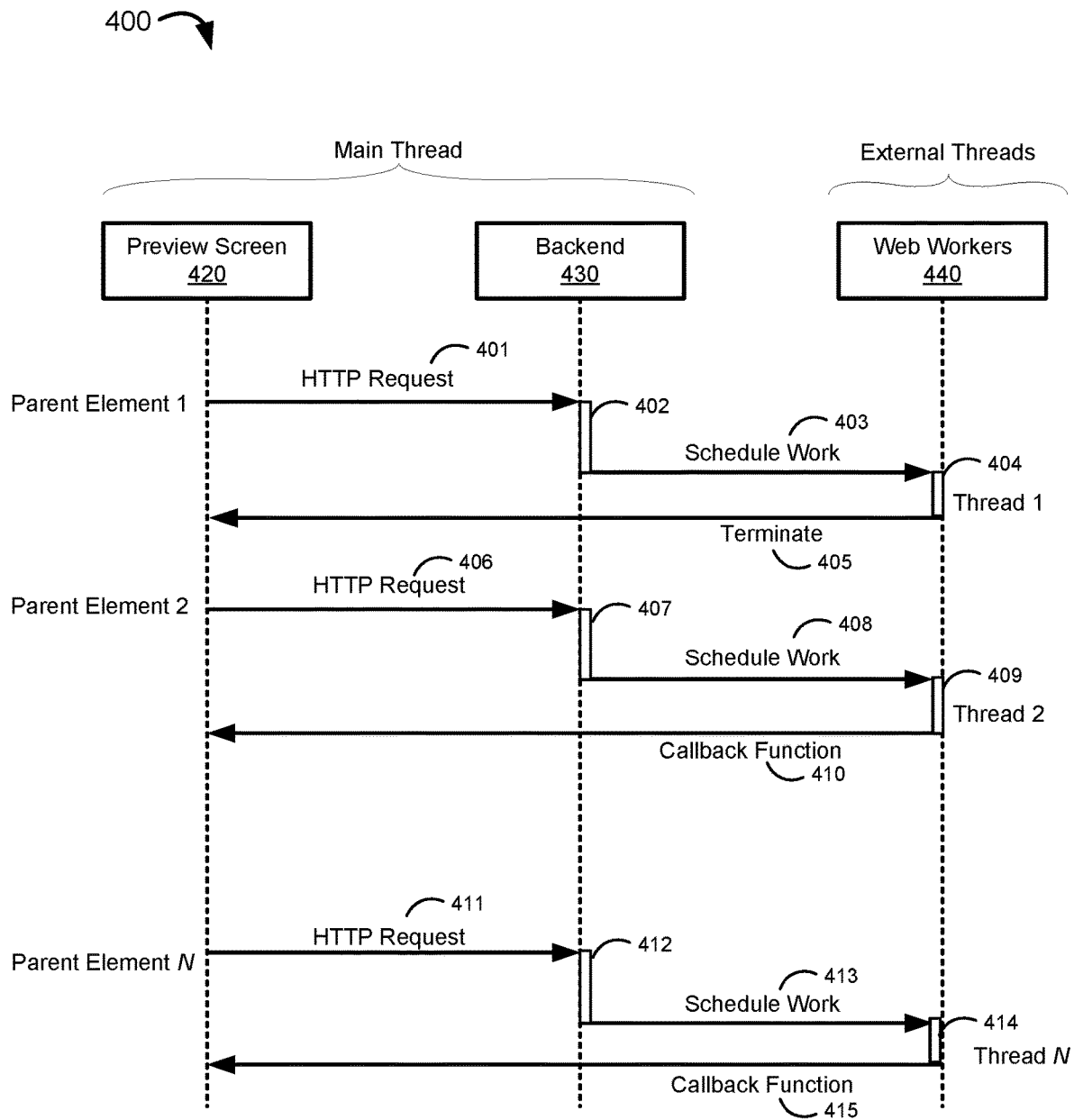
FIG. 4 shows a diagram of HTTP requests and web worker scheduling, according to an embodiment.

FIG. 4 shows a diagram 400 of HTTP requests and web worker scheduling, according to an embodiment. The call flow diagram of FIG. 4 shows a similar process as the one described above with respect to FIG. 3 but from a different perspective. The diagram 400 includes a preview screen 420 and a backend process 430 which execute in a "main thread" and web workers 440 which execute in external treads which are different from the main thread. The "preview" may be a preview of the document/report shown in the UI as discussed above with respect to FIG. 3. The backend 430 may be an OData service that handles calls (e.g., HTTP Requests) for information, which it obtains by querying a database (not shown).

A parent element 1 of the preview screen 420 sends an HTTP request 401 to the backend 430 (e.g., an OData service). The request 401 is for a batch as described above. The batch may include information for a particular table or for a group of forms as discussed above.

At 402 the backend 430 queries a database (not shown) containing the information for the report and then receives a response from the database.

At 403 the backend 430 schedules work on the response to be done (e.g., parsing of the response data and formatting it as a form or table).

At 404 a web worker is instantiated in Thread 1 by the Web Workers component 440. The web worker performs processing of the response data as discussed above and then sends a response back to the preview screen 420.

In this example, at 405 the web worker sends a response to terminate back to the preview screen 420.

A parent element 2 of the preview screen 420 sends an HTTP request 406 to the backend 430 (e.g., an OData service). The request 406 is for a batch as described above. The batch may include information for a different particular table, or for a group of forms, as discussed above. Except that if the request 401 was for a group of forms then it would include all forms to reduce the number of calls/requests.

At 407 the backend 430 queries the database containing the information for the report and then receives a second response from the database.

At 408 the backend 430 schedules work on the second response to be done (e.g., parsing of the response data and formatting it as a form or table).

At 409 a second web worker is instantiated in Thread 2 by the Web Workers component 440. The second web worker performs processing of the response data as discussed above and then sends a response back to the preview screen 420.

In this example, at 410 the web worker sends a callback function to the preview screen 420.

As mentioned above, the calls to the backend and the processing of requests by the web workers may take place in parallel. Thus, while processing occurs in the order shown by the arrows in diagram 400, it is not the case that time is along the y axis going down. Instead, the requests and threads may be performed at the same time in parallel.

Furthermore, there may be N number of requests and N web workers, as mentioned above, where N is the number of batches that the nodes selected by the user has been divided into (e.g., divided based on tables or forms or other data structures).

For instance, a parent element N of the preview screen 420 sends an HTTP request 411 to the backend 430 (e.g., an OData service). The request 411 is for a batch as described above. The batch may include information for a different particular table, or for a group of forms, as discussed above.

At 412 the backend 430 queries the database containing the information for the report and then receives a second response from the database.

At 413 the backend 430 schedules work on the second response to be done (e.g., parsing of the response data and formatting it as a form or table).

At 414 a second web worker is instantiated in Thread 2 by the Web Workers component 440. The second web worker performs processing of the response data as discussed above and then sends a response back to the preview screen 420.

In this example, at 415 the web worker sends a callback function to the preview screen 420.

Thus, the information selected by the user is requested in batches and each batch is processed in separate threads such that the user interface preview screen does not encounter timeout errors.

FIG. 5 shows an example hierarchical structure 500 of a technical file having various sections and subsections, according to an embodiment. The hierarchical structure of FIG. 5 was previously discussed above.

FIG. 5 shows an example document/report which is called "AuditFile." It contains nodes in a hierarachical structure including Header, MasterFiles, GeneralLedgerEntries, and SourceDocuments and these nodes may have children nodes. For example, the MasterFiles node has GeneralLedgerAccounts, Customer, Customer, Customer, Supplier, Supplier and so on as its children nodes. Each node may be selectable by the user in the user interface as mentioned above.

FIG. 6 shows an example of data 600 within a technical file formatted as a hierarchy having various sections and subsections, according to an embodiment. The data 600 in FIG. 6 corresponds to the hierarchical structure 500 of FIG. 5. For instance, the data in FIG. 4 includes data for the MasterFiles node and its child node GeneralLedgerAccounts mentioned above with respect to FIG. 5.

The hierarchy and data shown in FIGS. 5 and 6 are just examples. Embodiments of the optimized batch UI call and response processing technique works with other documents/reports having a different hierarchical structure and different data.

Example Hardware

FIG. 7 shows a diagram 700 of hardware of a special purpose computing machine for implementing systems and methods described herein. The following hardware description is merely one example. It is to be understood that a variety of computers topologies may be used to implement the above described techniques. The hardware shown in FIG. 7 may be used to implement the computer systems and computer software (computer reprogram code) described herein.

The computer system 710 includes a bus 705 or other communication mechanism for communicating information, and one or more processor(s) 701 coupled with bus 705 for processing information. The computer system 710 also includes a memory 702 coupled to bus 705 for storing information and instructions to be executed by processor 701, including information and instructions for performing some of the techniques described above, for example. This memory may also be used for storing programs executed by processor(s) 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device and memory are both examples of non-transitory computer readable storage mediums.

The computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses, for example.

The computer system also includes a network interface 704 coupled with bus 705. The network interface 704 may provide two-way data communication between computer system 710 and a network 720. The network interface 704 may be a wireless or wired connection, for example. The network 720 may be a local area network or an intranet, for example. The computer system 710 can send and receive information through the network interface 704, across the network 720, to computer systems connected to the Internet 730. Using the Internet 730 the computer system 710 may access data and features that reside on multiple different hardware servers 731-734. The servers 731-734 may be part of a cloud computing environment in some embodiments.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors;
one or more machine-readable medium coupled to the one or more processors and storing computer program code comprising sets of instructions executable by the one or more processors to:
obtain a selection, via a user interface, of one or more nodes of a hierarchy, the hierarchy corresponding to a hierarchical data structure of a data file containing information to be presented in the user interface based on the selection;
send one or more separate requests to a database to obtain information corresponding to each of the one or more nodes;
obtain one or more responses from the database, each response corresponding to a particular request;
process each of the one or more responses to obtain parsed data for each of the one or more responses, the one or more responses being processed in separate threads such that the one or more responses are executable in parallel, the processing of each of the one or more responses outputting parsed data for the corresponding response;
obtain the parsed data output by the separate threads; and
incrementally present the parsed data for a particular response in the user interface as the parsed data is obtained.

2. The computer system of claim 1, wherein the one or more separate requests comprise a plurality of requests, the plurality of requests comprising at least one request including information for each node to be parsed into a form format and the plurality of requests comprise other requests not including information to be parsed into the form format.

3. The computer system of claim 1, wherein the processing of each of the one or more responses is performed without issuing a timeout error in the user interface and without the user interface freezing or becoming unresponsive.

4. The computer system of claim 1, wherein the processing of each of the one or more responses includes parsing the data using java script.

5. The computer system of claim 1, wherein the one or more responses are processed in separate threads using separate web worker instances.

6. The computer system of claim 1, wherein the one or more requests are made using an Open Data protocol.

7. One or more non-transitory computer-readable medium storing computer program code comprising sets of instructions to:
obtain a selection, via a user interface, of one or more nodes of a hierarchy, the hierarchy corresponding to a hierarchical data structure of a data file containing information to be presented in the user interface based on the selection;

send one or more separate requests to a database to obtain information corresponding to each of the one or more nodes;

obtain one or more responses from the database, each response corresponding to a particular request;

process each of the one or more responses to obtain parsed data for each of the one or more responses, the one or more responses being processed in separate threads such that the one or more responses are executable in parallel, the processing of each of the one or more responses outputting parsed data for the corresponding response;

obtain the parsed data output by the separate threads; and incrementally present the parsed data for a particular response in the user interface as the parsed data is obtained.

8. The non-transitory computer-readable medium of claim 7, wherein the one or more separate requests comprise a plurality of requests, the plurality of requests comprising at least one request including information for each node to be parsed into a form format and the plurality of requests comprise other requests not including information to be parsed into the form format.

9. The non-transitory computer-readable medium of claim 7, wherein the processing of each of the one or more responses is performed without issuing a timeout error in the user interface and without the user interface freezing or becoming unresponsive.

10. The non-transitory computer-readable medium of claim 7, wherein the processing of each of the one or more responses includes parsing the data using-javascript.

11. The non-transitory computer-readable medium of claim 7, wherein the one or more responses are processed in separate threads using separate web worker instances.

12. The non-transitory computer-readable medium of claim 7, wherein
the one or more requests are made using an Open Data protocol.

13. A computer-implemented method, comprising:

obtaining a selection, via a user interface, of one or more nodes of a hierarchy, the hierarchy corresponding to a hierarchical data structure of a data file containing information to presented in the user interface based on the selection;

sending one or more separate requests to a database to obtain information corresponding to each of the one or more nodes;

obtaining one or more responses from the database, each response corresponding to a particular request;

processing each of the one or more responses to obtain parsed data for each of the one or more responses, the one or more responses being processed in separate threads such that the one or more responses are executable in parallel, the processing of each of the one or more responses outputting parsed data for the corresponding response;

obtaining the parsed data output by the separate threads;

incrementally present the parsed data for a particular response in the user interface as the parsed data is obtained.

14. The computer-implemented method of claim 13, wherein the one or more separate requests comprise a plurality of requests, the plurality of requests comprising at least one request including information for each node to be parsed into a form format and the plurality of requests comprise other requests not including information to be parsed into the form format.

15. The computer-implemented method of claim 13, wherein the processing of each of the one or more responses is performed without issuing a timeout error in the user interface and without the user interface freezing or becoming unresponsive.

16. The computer-implemented method of claim 13, wherein the one or more responses are processed in separate threads using separate web worker instances.

17. The computer-implemented method of claim 13, wherein the one or more requests are made using an Open Data protocol.

* * * * *